J. B. COUTURE.
FORMING DEVICE.
APPLICATION FILED AUG. 27, 1914.
1,132,074.
Patented Mar. 16, 1915.
2 SHEETS—SHEET 1.
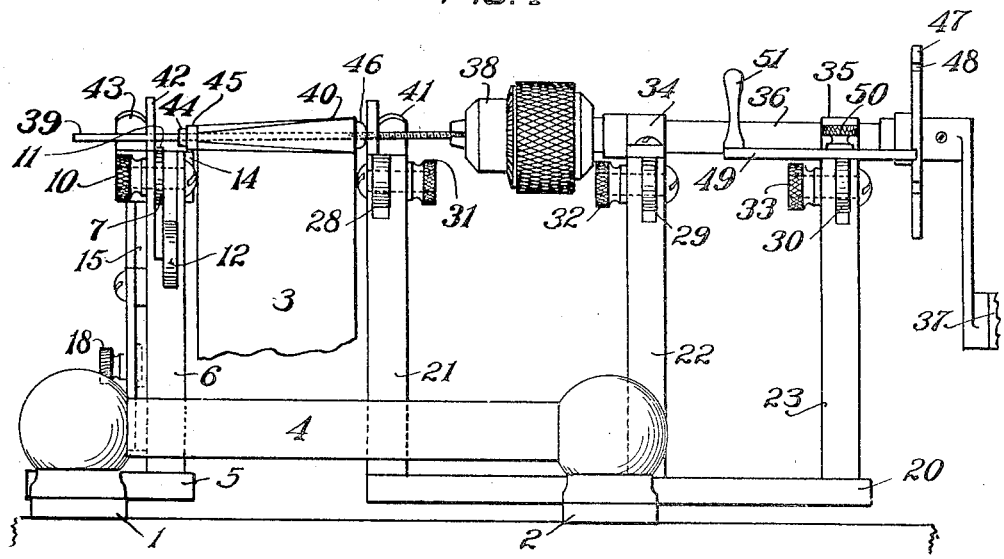
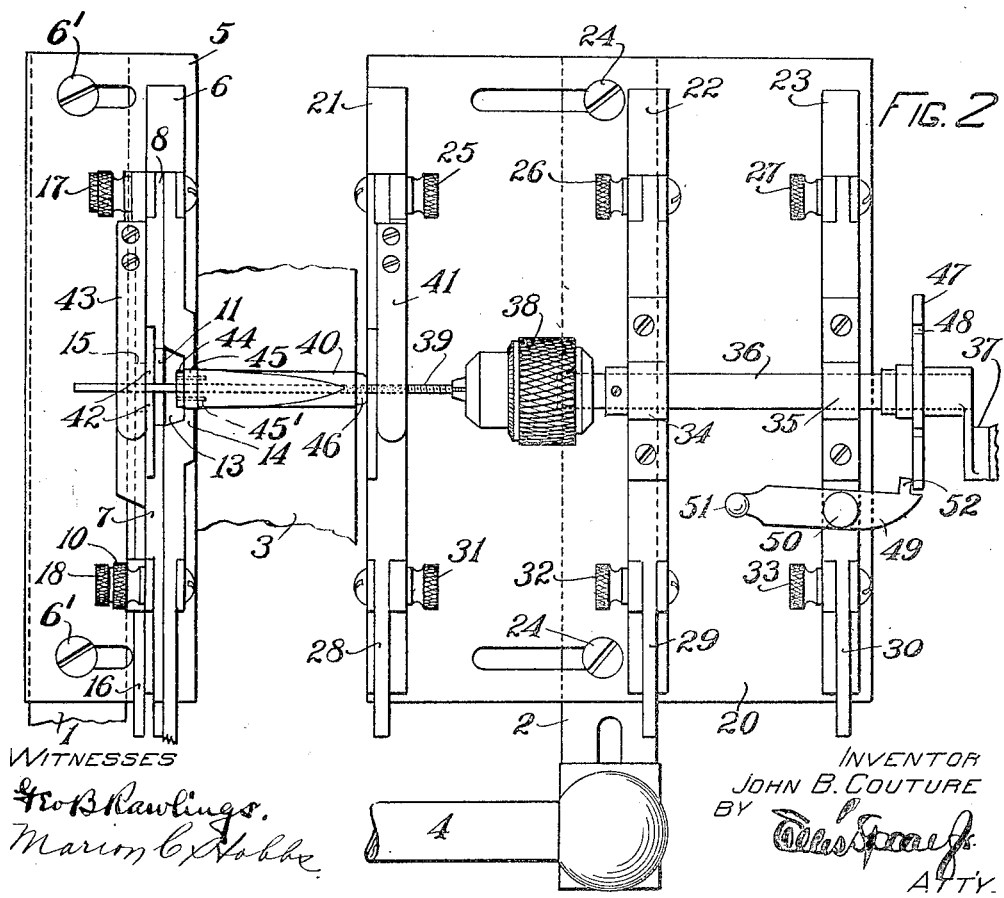
WITNESSES
Geo B Rawlings.
Marion C Hobbs.
INVENTOR
JOHN B. COUTURE
BY
ATTY.

J. B. COUTURE.
FORMING DEVICE.
APPLICATION FILED AUG. 27, 1914.

1,132,074.
Patented Mar. 16, 1915.
2 SHEETS—SHEET 2.

WITNESSES
Geo B Rawlings.
Marion C Hobbs.

INVENTOR
JOHN B. COUTURE
BY
ATT'Y.

UNITED STATES PATENT OFFICE.

JOHN B. COUTURE, OF FALL RIVER, MASSACHUSETTS.

FORMING DEVICE.

1,132,074. Specification of Letters Patent. Patented Mar. 16, 1915.

Application filed August 27, 1914. Serial No. 858,932.

*To all whom it may concern:*

Be it known that I, JOHN B. COUTURE, a subject of George V, King of England, residing at 2317 South Main street, Fall River, Massachusetts, have invented certain new and useful Improvements in Forming Devices, of which the following is a specification.

This invention relates to forming devices and particularly to a machine for shaping articles of irregular contour.

The particular machine which I shall illustrate and discuss for the purposes of my present invention is especially adapted to shape the stems or bits of pipes although it might be used for other purposes, and the principles thereof may be readily adapted to machines for other uses.

One of the features of my invention to which special reference is made is to the control of the work and its guidance toward or from the shaping device so as to produce the conformation desired.

The various features of my invention will be more fully disclosed and discussed in the specification which follows and in the drawings which form a part of that specification I have shown a machine which supplies an illustrative embodiment of the principles involved as well as a successful and operative mechanism for the specific purpose set forth.

Figure 3:
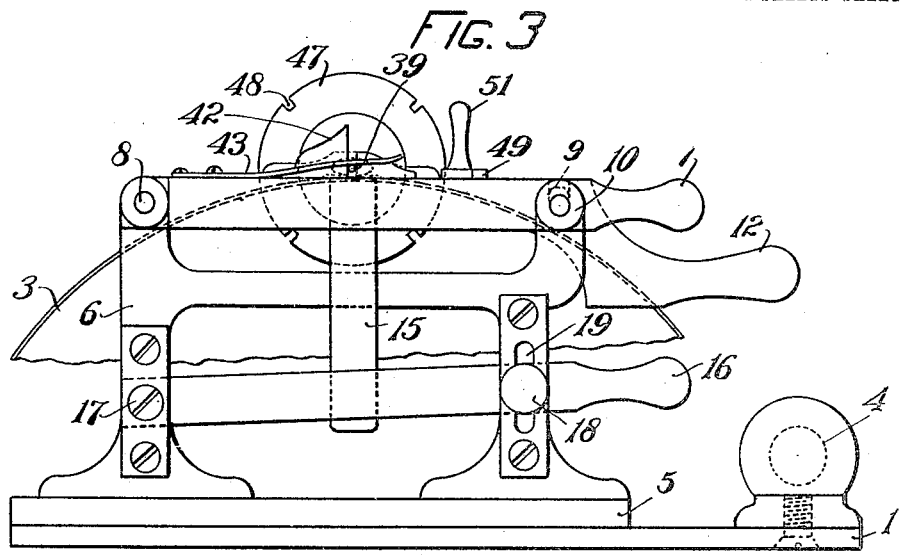
Figure 4:
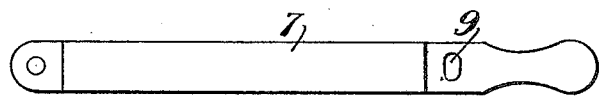
Figure 5:
Figures 7, 9:
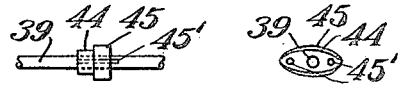
Figure 6:
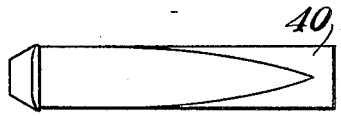
Figure 8:
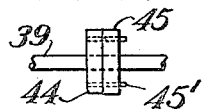

Throughout specification and drawings like reference numerals are employed to indicate corresponding parts, and in the drawings: Figure 1 is a side elevation of a machine embodying my invention and especially adapted to shape pipe stems, Fig. 2 is a plan view thereof, Fig. 3 is an end view, Fig. 4 is a detail of one of the adjusting levers, Figs. 5 and 6 are illustrative views of stems, Figs. 7 and 8 are side and plan views respectively of the operating cams, and Fig. 9 is an end view of said cams.

The machine shown comprises a pair of slides 1—2, which may move in any suitable slide way (not shown) relative to an abrasive wheel 3, and are moved by a handle 4. Adjustably mounted on one slide 1 is a plate 5 carrying the frame 6. The adjustment is held by set screws 6¹. The frame 6 has pivoted thereto a pair of adjusting levers. The outside lever 7 is pivoted at one end at 8, to the frame 6. Near its other end it has a locking notch 9 adapted to engage over the stem of a set screw 10 whereby the lever is locked in adjusted position. Between its ends this lever has a slightly raised bearing or supporting surface in the form of a ledge 11, (see Fig. 2). The inside lever 12 is pivoted at one end to the frame 6 on the pivot 8 for the lever 7. Between its ends and opposite the ledge 11 the lever 12 has a vertical slot 13 and is offset inwardly as indicated at 14 (Fig. 2) to provide a supporting surface set in from the frame 6.

Adjustably guided in a slot in the lever 7 is a vertically disposed link 15. The adjustment of said link is effected by an adjusting lever 16 connected to said link at its lower end. The lever 16 is pivoted at one end at 17 to one of the end pieces of the frame 6. The opposite end piece of the frame 6 is slotted edgewise to receive and guide the free end of the lever 16. The lever is adjustably held at this end by a set screw 18 working in an elongated slot 19 in the end piece of the frame. Adjustment of the lever 16 varies the working position of the link 15 relative to the abrasive wheel.

Adjustably mounted on the slide 2 is a plate 20 carrying a series of frames 21, 22 and 23. The adjustment of the plate 20 is held by a pair of set screws 24. The plate 20 is moved simultaneously with the plate 5 in their respective slide ways by means of the handle 4 which is grasped by the workman and reciprocated to and from the wheel.

Pivotally mounted at 25, 26 and 27, respectively, on the frames 21, 22 and 23, is a series of adjusting levers 28, 29 and 30. The adjustment of these levers is independently held by a series of set screws 31, 32 and 33, whereby the effective position of any of the series of levers may be varied without affecting the adjustment of the other levers.

Slidably and rotatably journaled in bearings 34 and 35 on the levers 29 and 30, is a shaft 36 rotatable by a hand crank 37. The shaft 36 has a chuck 38, in which a work spindle 39 is detachably clamped. The diameter of the spindle 39 corresponds to the bore of the pipe stem or other stock 40 carried by the spindle.

The bearing for the spindle 39 on the lever 28 is found in a blade spring 41 fastened to the lever at one end and yieldingly clamping the spindle to said lever at its free end. The bearing for the spindle 39 on the frame 6 is found in two spaced lugs 42 which are preferably curved as shown in the drawing and define an open sided and open top recess in which the spindle is received and yieldingly clamped by a blade spring 43 fastened to the frame 6 with its free end overlying said recess and bearing upon the outer end of the spindle end.

Mounted on the spindle 39 near its outer end is a pair of elliptical cams 44 and 45. The cams are pinned to each other by the pins 45¹ and are of substantially the same length. The outer cam 44 however is not quite so wide as the inner cam 45. These cams with the supporting surfaces 11 and 14 of the levers 7 and 12 control the effective movement of the stock 40 carried on the work spindle 39 relative to the periphery of the abrasive wheel 3. Variations in the relative positioning of the cams brings the stock into and out of partial or entire longitudinal contact with the abrasive wheel. Different sets of cams are provided for different styles of bits or stems. The pins 45¹ are adapted to enter holes in the end of the stock to prevent the stock from turning on the spindle.

The operation thus far is as follows: A piece of stock to be shaped into a pipe bit is placed on the spindle 39 with the desired cams thereon and with the cam 45 brought up close against one end of the stock, and the pins 45¹ fitted in two holes in the stock at this end. A small rubber buffer 46 is then inserted onto the spindle and brought up against the opposite end of the stock so that said buffer lies between the stock and the frame 21. The spindle is then clamped in the chuck 38. The unshaped stock in its original form is usually of rectangular cross section. The pipe bit in its finished form is usually either cylindrical or rectangular at that end which is inserted into the bore of the pipe and is thinned longitudinally on two sides so that its cross section near the mouth piece is slightly flattened or elliptical. Where the pipe bit is to be cylindrical in cross section at its inner or pipe end the stock is turned in this manner. The lever 16 is moved to raise the upper supporting end of the link 15 above the plane of the frame 4. The spindle 39 is then moved across the machine to position its outer end on the upper end of the link with its pair of cams disposed beyond the link and unsupported. The lever 16 is then adjusted to so position the link 15 that the stock on the spindle will lie wholly in contact with the abrasive wheel. In this position of support the spindle will rotate as a true or fixed axis when turned by the hand crank 37 and the stock will be turned off symmetrically on all sides to the form of a cylinder when the work is fed to the abrasive wheel. Where the stock in its initial form is cylindrical, this step is of course unnecessary.

Similarly, this step could be performed in another machine, as a lathe, if desired.

The next step consists in turning off the stem on two sides to reduce it to substantially elliptical form except at its inner end which is left cylindrical. The link 15 is first lowered and the lever 12 raised. The spindle is then moved to bring its large cam 45 on the supporting surface 14 of said lever with its small cam 44 in the slot 13. The lever 12 is then adjusted as necessary to bring the stock in the plane of contact with the abrasive wheel. Power is again applied to rotate the abrasive wheel and the spindle is rotated slowly by hand. In this rotation of the spindle, the cam 45 gives to it an elliptical motion which reduces the stock to the formation indicated by the dotted lines A, in Fig. 5.

The next step consists in forming the notch or shoulder B at the mouthpiece of the stem. The lever 12 is first lowered and the lever 7 raised. The spindle is then moved to bring its small cam 44 on the supporting surface 11 of said lever 7 with its large cam in the slot 13. The lever 7 is adjusted as necessary. The work is then slid up to the abrasive wheel and the spindle is slowly rotated by hand. The elliptical motion given the spindle by the cam 44 reduces the stock to the formation indicated by the full lines C, Fig. 5. The end of the pipe bit is now ready to be shaped up and the whole polished. This is done by removing it from the work spindle and holding it in the hands against suitable buffer wheels (not shown) which may be applied to the shaft which carries the abrasive wheel.

Where the pipe bit is to have a squared inner end the series of levers 28, 29 and 30 are used. Steps 1, 2 and 3 are performed, but before the bit is removed from the work spindle 39 for final shaping up and polishing, the lever 7 is again raised to wholly clear the mouthpiece end of the stock from the abrasive wheel. This brings the inner pipe end of the stock down against the abrasive wheel. The positioning of this end of the stock relative to the wheel is determined by adjusting the series of levers 28, 29 and 30.

In order that the stock may be squared symmetrically and truly at its inner end, it is desirable to positively hold the spindle 39 against unintentional rotation. This is done in the present machine by means of a wheel 47 mounted on the shaft 36 and provided with four equidistant peripheral notches 48 in any of which may be selectively engaged the free end of a locking lever 49 pivoted between its ends to the frame 23 by a set screw 50 and provided with an operating handle 51. The arrangement is such that the engaging end of the lever 49 may be inserted in one of the notches 48 to hold one side of the stock tangential to the abrasive wheel until the operative deems that a sufficient amount of material has been removed from this side. The locking lever is then swung upon its pivot to release the wheel 47 which is then turned through a quarter of a revolution until another notch 48 comes into position opposite the locking lever, whereupon said lever is engaged in that notch and another side of the stock is trimmed down. The engaging end of the lever 49 is provided with a lug 52 adapted when the lever is properly positioned to prevent too great movement of the spindle 39 in either direction.

While I have shown and described my present invention as adapted to the shaping of bits or stems for pipes, it is of course understood that I do not limit myself to this adaptation, but reserve the right to use the machine in any situation where it will satisfactorily perform the intended functions.

Various modifications in the form and construction of my device may obviously be resorted to, all without departing from the spirit of my invention, if within the limits of the appended claims.

What I therefore claim and desire to secure by Letters Patent is:

1. In a machine for shaping articles of irregular contour a rotatable shaping device, a rotatable work support effectively disposed relative to said shaping device, and means for imparting elliptical motion to said work support to vary its effective successive positionings relative to said shaping device.

2. In a machine for shaping articles of irregular contour, a rotatable shaping device, a rotatable work support effectively disposed relative to said shaping device, and means for imparting eccentric motion to said work support to vary its effective successive positionings relative to said shaping device.

3. In a machine for shaping articles of irregular contour, a rotatable shaping device, a rotatable work support effectively disposed relative to said shaping device, and irregularly shaped bearing devices associated with said work support for causing said work support to describe an orbital path of travel when rotated, whereby its effective successive positionings relative to said shaping device are varied.

4. In a machine for shaping articles of irregular contour, a rotatable shaping device, a work support movable relative to said shaping device, an adjustable mount for said work support, and means coöperating with said mount for varying the orbit through which said work support rotates relative to said shaping device to control the effective longitudinal bearing of the work upon said shaping device.

5. In a machine for shaping articles of irregular contour, a rotatable shaping device, a rotatable work support effectively disposed relative to said shaping device, an adjustable mount for said work support including an irregular shaped contact device adapted to find bearing on said mount for varying the effective position of said work support relative to said shaping device to control the effective longitudinal bearing of the work upon said shaping device.

6. In a machine for shaping articles of irregular contour, a rotatable shaping device, a rotatable work support effectively disposed relative to said shaping device, means associated with said work support for causing it to describe an eccentric path when rotated, an adjustable mount for said motion converting means including spaced supporting surfaces upon which said means are adapted to have bearing, and means for varying the effective position of said mount relative to said shaping device to control the effective longitudinal bearing of the work upon said shaping device.

7. In a machine for shaping articles of irregular contour, a rotatable shaping device, a rotatable work support effectively disposed relative thereto, means associated with said work support for causing said work support to describe an eccentric path of travel when rotated, and means coöperating with said motion converting means for varying the effective positioning of said work support relative to said shaping device.

8. In a machine for shaping articles of irregular contour, a rotatable shaping device, a rotatable work support effectively disposed relative thereto, irregularly shaped bearing devices and adjustable supportive surfaces therefor associated with said work support for causing said work support to describe an irregular path of travel when rotated, and means coöperating with said motion converting devices for varying the effective positioning of said work support relative to said shaping device.

9. In a machine for shaping articles of irregular contour, a rotatable shaping device, a rotatable work support effectively disposed relative thereto, cams carried by said work support and adjustable supportive surfaces for said cams for causing said work support to describe an orbital path of travel when rotated, and levers coöperating with said supporting surfaces for varying the effective positioning of said work support relative to said shaping device.

10. In a machine for shaping articles of irregular contour, a rotatable shaping device, a rotatable work support movable relative thereto, means associated with said work support for causing it to describe a non-circular path of travel when rotated, and an adjustable mount for said motion converting means having independently adjustable supportive surfaces upon which said motion converting means are adapted to be selectively positioned whereby the effective longitudinal contact of the work with said shaping device may be controlled.

11. In a machine for shaping articles of irregular contour, a rotatable shaping device, a rotatable work support movable relative thereto, means associated with said work support for causing it to describe an elliptical path of travel when rotated, and an adjustable mount for said motion converting means having independently adjustable supporting surfaces disposed in different planes and upon which said motion converting means are adapted to be selectively positioned whereby the effective longitudinal contact of the work with said shaping device may be controlled.

12. In a machine for shaping articles of irregular contour, a rotatable shaping device, a rotatable work support movable relative thereto, cams carried by said work support for causing it to describe a non-circular path of travel when rotated, and an adjustable mount for said cams having independently adjustable supportive surfaces disposed in different planes and upon which said cams are adapted to be selectively positioned whereby the effective longitudinal contact of said work with said shaping device may be controlled.

13. In a machine for shaping articles of irregular contour, a rotatable shaping device, a rotatable work support movable relative thereto, a plurality of contact devices associated with said work support for causing it to describe an irregular path of travel when rotated, and an adjustable mount for said motion converting devices including a pair of pivoted adjusting members having oppositely disposed supportive surfaces upon which said contact devices are adapted to be selectively positioned whereby the effective longitudinal contact of the work with said shaping device may be controlled.

14. In a machine for shaping articles of irregular contour, a rotatable shaping device, a rotatable work support movable relative thereto, a plurality of contact devices associated with said work support for causing it to describe an irregular path of travel when rotated, and an adjustable mount for said motion converting devices including a pair of pivoted adjusting members having oppositely disposed supportive surfaces spaced by a slot and arranged in different planes and upon which said contact devices are adapted to be selectively positioned whereby the effective longitudinal contact of the work with said shaping device may be controlled.

15. In a machine for shaping articles of irregular contour, a rotatable shaping device, a rotatable work support movable relative thereto, a plurality of cams associated with said work support for causing it to describe a non-circular path of travel when rotated, and an adjustable mount for said motion converting devices including a pair of pivoted adjusting levers having oppositely disposed supportive surfaces spaced by a slot and arranged in different planes and upon which said cams are adapted to be selectively positioned whereby the effective longitudinal contact of said work with said shaping device may be controlled.

16. In a machine for shaping articles of irregular contour, a rotatable shaping device, a frame adjustable relative thereto, a pair of adjusting members pivoted to said frame and having oppositely disposed supportive surfaces, a work support movable relative to said shaping device and having a yielding bearing in said frame, and a variable contact with said supportive surfaces whereby the effective contact of the work with said shaping device is controlled.

17. In a machine for shaping articles of irregular contour, a rotatable shaping device, a frame adjustable relative thereto, a pair of adjusting members pivoted to said frame and having oppositely disposed supportive surfaces arranged in different planes and spaced from each other by a slot, a work support movable relative to said shaping device and having a yielding bearing in said frame, and a variable contact with said supportive surfaces including a pair of different sized contact devices arranged for selective positioning on said supportive surfaces to control the effective contact of the work with said shaping device.

18. In a machine for shaping articles of irregular contour, a rotatable shaping device, a frame adjustable relative thereto, a pair of adjusting levers pivoted to said frame and having oppositely disposed supportive surfaces arranged in different planes and spaced from each other by a slot, a work support movable relative to said shaping device and having a yielding bearing in said frame, and a variable contact with said surfaces including a pair of different sized cams arranged for selective positioning on said supportive surfaces to control the effective contact of the work with said shaping device.

19. In a machine for shaping articles of irregular contour, a rotatable shaping device, a pair of slides movable relative thereto, a plurality of frames on said slides, a work support rotatably and slidably mounted in said frames, and a plurality of adjusting members pivoted to said frames and effective to control the positioning of said work support relative to said shaping device.

20. In a machine for shaping articles of irregular contour, a rotatable shaping device, a pair of slides movable relative thereto, a plurality of frames on said slides, a work support rotatably and slidably mounted in said frames, and a plurality of adjusting levers pivoted to said frames and having supportive surfaces for said work support disposed in different planes and effective to control the positioning of said work support relative to said shaping device.

21. In a machine for shaping articles of irregular contour, a rotatable shaping device, a pair of slides movable relative thereto, a plurality of frames on said slides, a plurality of adjusting levers pivoted to said frames, a pair of said levers having oppositely disposed spaced supportive surfaces arranged in different planes, and a plurality of variable contact devices on said work support arranged for selective contact with said supportive surfaces to control the effective positioning of said work support relative to said shaping device.

22. In a machine for shaping articles of irregular contour, a rotatable shaping device, a pair of slides movable relative thereto, a plurality of frames on said slides, a plurality of adjusting levers pivoted to said frames, a pair of levers having oppositely disposed spaced supportive surfaces arranged in different planes, and a plurality of cams on said work support arranged for selective contact with said supportive surfaces to control the effective positioning of said work support relative to said shaping device.

23. In a machine for shaping articles of irregular contour, a rotatable shaping device, a rotatable and longitudinally movable work support effectively disposed relative thereto and selectively rotatable in different planes, an adjustable mount for said work support to control its effective positioning relative to the shaping device, and means for positively locking said work support to rotate in a desired plane.

24. In a machine for shaping articles of irregular contour, a rotatable shaping device, a rotatable and longitudinally movable work support effectively disposed relative thereto, an adjustable mount for said work support to control its effective positioning relative to the shaping device, and means for positively locking said work support to rotate in a desired plane including a rotatable locking member and a pivoted locking member adapted for locking engagement with each other.

25. In a machine for shaping articles of irregular contour, a rotatable shaping device, a rotatable and longitudinally movable work support effectively disposed relative thereto, an adjustable mount for said work support to control its effective positioning relative to the shaping device, and means for positively locking said work support to rotate in a desired plane including a rotatable notched disk and a pivoted locking lever adapted for selective locking engagement with the notches of said disk.

26. In a machine for shaping articles of irregular contour, a rotatable shaping device, a rotatable work support effectively disposed relative thereto, an irregularly shaped bearing device associated with said work support for imparting variable motion thereto, and a supporting surface for said bearing device adjustable relative to the axis of said work support to provide a variable support for said bearing device.

27. In a machine for shaping articles of irregular contour, a rotatable shaping device, a rotatable work support effectively disposed relative thereto, a cam associated with said work support for imparting variable motion thereto, and a supporting surface for said bearing device adjustable relative to the axis of said work support to provide a variable support for said cam.

28. In a machine for shaping articles of irregular contour, a rotatable shaping device, a rotatable work support effectively disposed relative thereto, an irregularly shaped bearing device associated with said work support for imparting variable motion thereto, a supporting surface for said bearing device adjustable relative to the axis of said work support to provide a variable support for said bearing device, and a bearing for the free end of said work support to permit said support to rotate on a true center.

29. In a machine for shaping articles of irregular contour, a rotatable shaping device, a rotatable work support effectively disposed relative thereto, means for varying the plane of said work support relative to said shaping device, and means for positively locking said work support to rotate in the desired plane.

30. In a machine for shaping articles of irregular contour, a rotatable shaping device, a rotatable work support having a bearing device for imparting variable motion thereto, and a plurality of adjustable supportive surfaces upon which said device may selectively bear whereby to vary the effective longitudinal contact of the work with said shaping device.

31. In a machine for shaping articles of irregular contour, a rotatable shaping device, a rotatable work support having a cam for imparting variable motion thereto, and a plurality of adjustable supportive surfaces upon which said cam may selectively bear whereby to vary the effective longitudinal contact of the work with said shaping device.

32. In a machine for shaping articles of irregular contour, a rotatable shaping device, a rotatable work support, a frame adjustable transversely and longitudinally for securing a rough adjustment of the work support relative to the shaping device, and means pivoted to said frame for securing a fine adjustment of said work support relative to said shaping device.

33. In a machine for shaping articles of irregular contour, a rotatable shaping device, a rotatable work support, a frame adjustable transversely and longitudinally for securing a rough adjustment of the work support relative to the shaping device, and a plurality of adjusting members pivoted to said frame for securing a fine adjustment of said work support relative to said shaping device.

34. In a machine for shaping articles of irregular contour, a rotatable shaping device, a rotatable and axially movable work support effectively disposed relative thereto, an irregularly shaped bearing device associated with said support for imparting variable motion thereto, and a plurality of supporting surfaces for said bearing device for varying the effective positioning of said work support relative to said shaping device.

35. In a machine for shaping articles of irregular contour, a rotatable shaping device, a rotatable and axially movable work support effectively disposed relative thereto, an irregularly shaped bearing device associated with said support for imparting variable motion thereto, and a plurality of supporting surfaces for said bearing device and selectively axially alinable with said support for varying the effective positioning of said work support relative to said shaping device.

36. In a machine for shaping articles of irregular contour, a shaping device, a rotatable and axially movable work support effectively disposed relative thereto, a plurality of irregularly shaped bearing devices associated with said work support for imparting variable motion thereto, and a supporting surface upon which said bearing devices are selectively seatable for varying the effective positioning of said work support relative to said shaping device.

37. In a machine for shaping articles of irregular contour, a rotatable and axially movable work support effectively disposed relative thereto, a plurality of irregularly shaped bearing devices associated with said work support for imparting variable motion thereto, and a supporting surface axially alinable with said work support and upon which said bearing devices are selectively seatable for varying the effective positioning of said work support relative to said shaping device.

38. In a machine for shaping articles of irregular contour, a rotatable shaping device, a rotatable and longitudinally movable work support effectively disposed relatively thereto, means for varying the plane in which said work support rotates relative to the shaping device, a rotatable disk and a pivoted locking lever arranged for locking engagement with each other for locking said work support to rotate in a desired plane, and means associated with said lever and disposed for contact with said disk for preventing an excessive longitudinal movement of the work support.

In testimony whereof I affix my signature in presence of two witnesses.

JOHN B. COUTURE.

Witnesses:
JEAN BAPTISTE DAUDELIN,
ARTHUR J. B. CARTIER.

Copies of this patent may be obtained for five cents each, by addressing the "Commissioner of Patents. Washington, D. C."